United States Patent Office 3,280,872
Patented Oct. 25, 1966

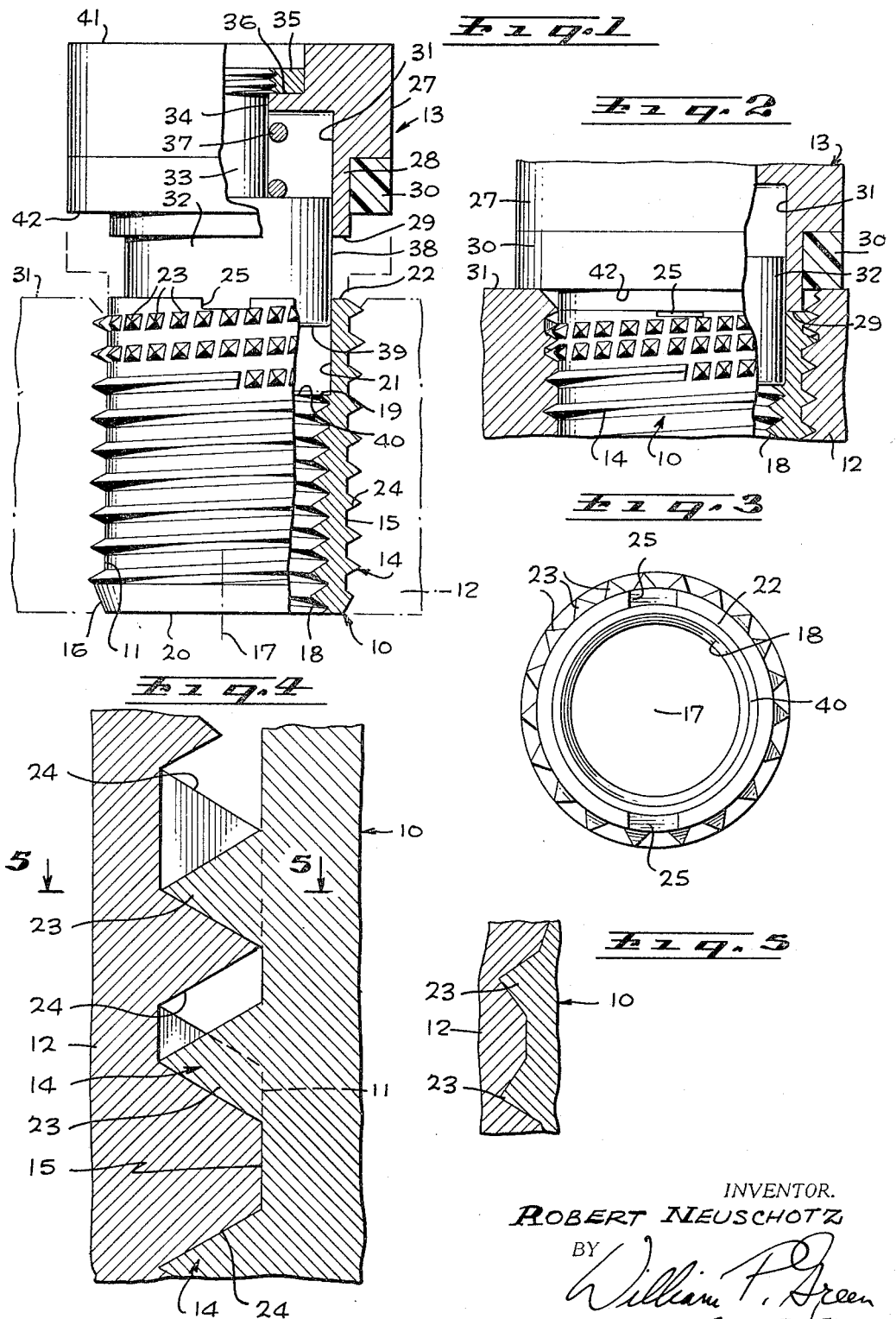

3,280,872
METHOD OF LOCKING THREADED ELEMENTS IN CARRIER PARTS AND ARTICLE PRODUCED THEREBY
Robert Neuschotz, 1162 Angelo Drive, Beverly Hills, Calif.
Filed Mar. 20, 1964, Ser. No. 353,530
10 Claims. (Cl. 151—22)

This invention relates to improved methods of locking a threaded element, such as an externally threaded insert, within a passage in a carrier part, and against unscrewing rotation from that part.

The general object of the invention is to provide a unique process which enables an insert or other externally threaded part to be screwed into a carrier part very easily, with a minimum of installation torque, and to then be converted to a locking condition after installation, in a manner effectively preventing unwanted removal of the element from the part. A third member may then be screwed into engagement with the installed element, for connection through that element to the carrier part, and if desired the third member may be removed and replaced repeatedly without disconnecting the insert element from the carrier part, in view of the effectiveness with which the insert is locked against unscrewing rotation. Further, it is an object of the invention to attain this locking action of the threaded element with respect to the carrier part with maximum facility, and optimum reliability in the locking action over an extended period of time.

To attain the discussed locking result, I utilize an insert or other element having external threads which are adapted to be screwed into threaded engagement with the carrier part, with a portion of these threads having serrations formed thereon so that as a particular turn of the external threads advances circularly, it forms a series of circularly spaced teeth or projections. The locking action is attained by first screwing the insert into the carrier part to a position in which the serrated portions of the threads are received within mating thread grooves in the carrier part, following which the serrated thread portion is driven axially in a manner causing it to bite into and form an interlock with the carrier part threads. More particularly, the serrated thread portion is driven axially relative to the rest of the external threads of the insert, and also relative to the carrier part, so that the serrations move axially out of the carrier part thread grooves within which they are initially received, and are forced axially into biting engagement with the adjacent thread projections of the carrier part. Thus, each of the serrations of the insert thread has an opportunity to itself form an interlock against unscrewing rotation of the insert, so that the composite effect of all of the serrations results in an extremely effective overall lock preventing back-out of the insert.

Preferably, the serrated portion of the insert is at its axially outer end, to be readily accessible to a driving tool, so that this portion may be easily driven axially relative to the rest of the insert. Also, it is preferred in most instances that the insert be of a type having internal threads axially inwardly beyond the locking end portion of the insert, for engagement with a mating screw.

The tool for effecting the above discussed type of locking action may be a driving tool adapted to press the axially outer end of the insert inwardly, after the insert has been screwed into a carrier part, with the driving action desirably being limited at a predetermined position by engagement of the tool with the surrounding portion of the carrier part. The tool may have a portion adapted to be received within the serrated portion of the insert during the driving operation, to support that portion internally against inward collapsing movement, and thereby assure that the intended locking engagement with the carrier part thread is attained. This internal supporting portion of the tool may be spring pressed inwardly, to be received within the insert prior to the driving operation, and in a manner enabling relative motion between a driving portion of the tool and this inner supporting element during the driving action.

The above and other features and objects of the invention will be better understood from the following detailed description of the typical embodiment illustrated in the accompanying drawing, in which:

FIG. 1 is a partly sectional and partly elevational view of an insert capable of being installed by the method of the present invention, together with a tool for performing the installing operation, with both parts being shown prior to locking of the insert in place;

FIG. 2 shows the insert and tool of FIG. 1 after the axial driving or locking step has been performed;

FIG. 3 is a plan view of the axially outer end of the insert;

FIG. 4 is a greatly enlarged fragmentary axial section through a portion of the FIG. 2 insert after the driving operation; and FIG. 5 is a fragmentary reduced scale section taken on line 5—5 of FIG. 4.

With reference first to FIG. 1, I have shown at 10 an insert which is to be installed by the process and apparatus of the present invention within a passage or bore 11 formed within a carrier part 12. A tool for use in the installing operation is illustrated generally at 13.

Insert 10 has external threads 14 preferably extending along substantially the entire axial length of the insert, with these threads typically having a modified minor diameter 15, and being annularly chamfered or tapered at their axially inner end 16. The external threads are centered about a main axis 17 of the insert, as are a series of internal threads 18 formed within the insert for receiving and threadedly engaging an externally threaded screw with which the insert is to be used. The purpose of the insert is of course to attach that screw to the carrier part 12 through the medium of the insert.

Internal threads 18 extend from the point 19 in FIG. 1 axially inwardly to the transverse axially inner end 20 of the insert. Axially outwardly of the location 19 of FIG. 1, the insert has an internal cylindrical counterbore 21 which may typically be of a diameter corresponding approximately to the major diameter of internal threads 18. This counterbore 21 continues axially outwardly to the location of an end surface 22 of the insert, which may be annular and extend directly transversely of axis 17.

To achieve the previously discussed locking action between insert 10 and carrier part 12, the portions of the external thread 14 which are radially opposite counterbore 21 are serrated, to form on those upper end turns of the thread a series of serrations or teeth 23. These serrations may be formed by knurling the end turns of the threads, with a conventional knurling tool. More specifically, the serration forming process may be performed by first forming the threads along the entire length of the insert, then knurling a portion of the threads, and finally chasing the knurled threads to reduce them back to their initial thread cross section. As will be understood, the knurling of the axially outer portions of the threads tends to spread the knurled threads axially to an increased cross section which would have difficulty advancing into the mating internal threads 24 in the carrier part. Consequently, I prefer to rechase the knurled threads with a chasing tool which is essentially the same as that originally used to form threads 14, or is shaped to form threads very slightly larger, so that the serrations may assume a cross section similar to or very slightly larger than the rest of the threads for reception within the carrier part threads 24 with little or no resistance.

To enable easy initial installation of the insert 10, the annular surface 22 at the axially outer end of the insert may contain a pair of diametrically opposed drive recesses 25, preferably having the illustrated shallow rectangular cross section, for reception of two drive lugs on an appropriate tool (not shown) in a manner turning the insert by rotation of the tool.

The tool 13 includes an annular body 27 which may have an annular inwardly projecting tubular portion 28 having a transverse annular end surface 29 adapted to engage and drive end surface 22 of the insert. About portion 28 of body 27, there may be received a motion limiting ring 30, typically formed of nylon or the like, and adapted to engage transverse surface 31 of carrier part 12 to limit axially inward driving movement of the tool body.

Internally, part 27 contains a cylindrical recess 31 within which there may be mounted a plunger 32 adapted for axial sliding movement in the direction of axis 17 relative to part 27. A shank 33 may project upwardly from plunger 32, and extend slidably through a passage 34 formed in part 27 to carry an enlarged nut or other head element 35 engageable with a shoulder 36 on part 27 to limit the axially inward (downward) movement of part 32 relative to part 27. A coil spring 37 contained within part 27 urges plunger 32 downwardly to the FIG. 1 position relative to part 27.

Externally, plunger 32 has a cylindrical surface 38 of a diameter corresponding approximately to the diameter of internal counterbore surface 21 in insert 10, so that plunger 32 may extend downwardly into the counterbore to the position of FIG. 2 in which the lower end surface 39 of the plunger engages and is stopped by an essentially annular shoulder 40 formed at the upper end of internal threads 18 of the insert. At its upper end, body 27 of tool 13 may have a transverse surface 41 which is engageable by a hammer or other driving tool, to drive part 27 downwardly.

To now describe the various steps performed in installing an insert by the method of the present invention, insert 10 is first screwed into carrier part 12, by an appropriate tool which engages drive recesses 25, and typically to the position of FIG. 1 in which surface 22 is flush with surface 31. As the insert is screwed into the carrier part, the lower unserrated threads first screw into engagement with carrier part threads 24, and finally the upper serrations 23 advance into the thread grooves of the carrier part, until the insert reaches the position of FIG. 1. Next, tool 13 is moved into engagement with the insert, to the broken line position of FIG. 1, with plunger 32 projecting into counterbore 21 of the insert. In this condition, surface 29 of the tool is in engagement with surface 22 of the insert, and the inner end 39 of the plunger is in substantial engagement with surface 40 at the end of the insert counterbore.

With the tool received in the insert in this manner, the operator drives body 27 downwardly from the broken line position of FIG. 1 to the position of FIG. 2, to thereby axially compress the upper serrated portion of the insert. As will be apparent from FIGS. 2 and 3, this axial compression causes the serrations 23 to cut downwardly into biting engagement with the adjacent threads of the carrier part, to form with those threads a highly effective lock against unscrewing rotation. The ultimate interlocking or interfitting relationship between serrations 23 and threads 24 of the carrier part 12 is brought out best in FIG. 5, from which it will be completely apparent that the interlock resulting from this action is extremely effective. As shown in FIG. 4, the axial displacement of the serrations 23 formed on the upper turn of the insert threads is somewhat greater than the axial displacement of the next lower turn, but preferably the construction of the insert is such as to attain substantial axial displacement of all of the serrations formed on the outside of the part. For this purpose, insert 10 is formed of a metal or other material, typically steel, which is capable of sufficient deformation to attain the discussed locking action, without forming cracks, tears, or other defects in the wall of the insert. Also, the deformation or axial compression is of course considerably beyond the elastic limit of the material, so that the material cannot elastically return to its initial condition.

The axial compression of the upper serrated portion of the insert is limited by engagement of the transverse annular under surface 42 of nylon ring 30 with upper surface 31 of the carrier part. The driving action may be effected by hammering downwardly against surface 41 of the tool, or by mounting tool body 27 within an appropriate press or other axial force applying power tool. As parts 27 and 30 are pressed downwardly to the FIG. 2 position, plunger 32 is retained against corresponding downward movement by engagement with shoulder 40, thus slightly compressing spring 37. Surface 38 of the plunger effectively retains counterbore 21 against inward collapsing movement, to thereby maximize the locking action.

I claim:
1. The method of installing, within a recess in a carrier part, an element having external threads with a first portion of said external threads having serrations formed thereon and a second portion being located axially inwardly of said first portion; said method including screwing said external threads into engagement with internal threads formed in said carrier part, then driving said first portion of the external threads axially relative to said second portion thereof and relative to said carrier part threads, and thereby forcing said serrations of said first portion of the external threads axially into adjacent portions of said carrier part threads to bite thereinto and lock the element against unscrewing rotation.

2. The method of installing, within a recess in a carrier part, an element having an axially outer end surface and having external threads with a first portion of said external threads having serrations former thereon and a second portion being located axially inwardly of said first portion; said method including screwing said external threads into engagement with internal threads formed in said carrier part, then exerting axially inward force against said end surface of the element to an extent driving said first portion of the external threads axially inwardly relative to said second portion thereof and relative to said carrier part threads, and thereby forcing said serrations of said first portion of the external threads axially into adjacent portions of said carrier part threads to bite thereinto and lock the element against unscrewing rotation.

3. The method of installing, within a recess in a carrier part, an essentially tubular element having external threads with a first portion of said external threads having serrations formed thereon and a second portion being located axially inwardly of said first portion; said method including screwing said external threads into engagement with internal threads formed in said carrier part, then driving said first portion of the external threads axially relative to said second portion thereof and relative to said carrier part threads, supporting said tubular element internally against radially inward collapsing movement at the location of said first portion of the external threads during said driving step, and thereby forcing said serrations of said first portion of the external threads axially into adjacent portions of said carrier part threads to bite thereinto and lock the element against unscrewing rotation.

4. The method of installing, within a recess in a carrier part, an element having external threads with a first portion of said external threads having serrations formed thereon and a second portion being unserrated and located axially inwardly of said first portion; said method including screwing both portions of said external threads into engagement with internal threads formed in said carrier part, then driving said first portion of the external threads axially relative to said second portion thereof and relative to said carrier part threads, and thereby forcing said serrations of said first portion of the external threads axially into adjacent portions of said carrier part threads to bite thereinto and lock the element against unscrewing rotation.

5. The method of installing, within a recess in a carrier part, an essentially tubular insert element having external threads with a first portion of said external threads having serrations formed thereon and a second portion being located axially inwardly of said first portion, said insert element having internal threads radially opposite said second portion of the external threads and having a counterbore radially opposite said first portion of the external threads; said method including screwing said external threads into engagement with internal threads formed in said carrier part, then driving said first portion of the external threads axially relative to said second portion thereof and relative to said carrier part threads, internally engaging and supporting said tubular insert element against radially inwardly collapse at the location of said counterbore, and thereby forcing said serrations of said first portion of the external threads axially into adjacent portions of said carrier part threads to bite thereinto and lock the element against unscrewing rotation.

6. The method of installing, within a recess in a carrier part, an essentially tubular element having an axially outer end surface and having external threads with a first portion of said external threads having serrations formed thereon and a second portion being located axially inwardly of said first portion; said method including screwing said external threads into engagement with internal threads formed in said carrier part, then exerting axially inward force against said end surface of the element to an extent driving said first portion of the external threads axially inwardly relative to said second portion thereof and relative to carrier part threads, supporting said tubular element internally against radially inward collapsing movement at the location of said first portion of the external threads during said driving step, and thereby forcing said serrations of said first portion of the external threads axially into adjacent portions of said carrier part threads to bite thereinto and lock the element against unscrewing rotation.

7. The method of installing, within a recess in a carrier part, an essentially tubular insert element having an essentially annular axially outer end surface and having external threads with a first portion of said external threads having serrations formed thereon and a second portion being unserrated and located axially inwardly of said first portion, said insert element having internal threads radially opposite said second portion of the external threads and having a counterbore radially opposite said first portion of the external threads; said method including screwing both portions of said external threads into engagement with internal threads formed in said carrier part, then exerting axially inward force essentially annularly against said end surface of the element to an extent driving said first portion of the external threads axially inwardly relative to said second portion thereof and relative to said carrier part threads, internally engaging and supporting said tubular insert element against radially inward collapse at the location of said counterbore, and thereby forcing said serrations of said first portion of the external threads axially into adjacent portions of said carrier part threads to bite thereinto and lock the element against unscrewing rotation.

8. The combination comprising a carrier part containing a bore having formed therein an internal thread and a thread groove between successive turns of said internal thread, and an element screwed into said bore and having an external thread, said external thread having a first portion mating with said internal thread and received within a portion of said thread groove, and said external thread having a second portion which is serrated and is displaced axially into the material of an adjacent turn of said internal thread to form a lock therewith preventing uncrewing rotation of said element.

9. The combination as recited in claim 8, in which said element is an essentially tubular insert having an internal thread radially opposite said first portion of said external thread and having a counterbore radially opposite said serrated second portion of said external thread.

10. The combination as recited in claim 8, in which said internal thread is of a predetermined uniform pitch along its entire extent, said first portion of said external thread being of said predetermined uniform pitch, and said second serrated portion of said external thread being of reduced pitch.

References Cited by the Examiner

UNITED STATES PATENTS

| | | |
|---|---|---|
| 1,769,591 | 7/1930 | McIntosh. |
| 2,038,124 | 4/1936 | Osborne. |
| 2,044,924 | 6/1936 | Timken _____ 29—523 |
| 2,932,082 | 4/1960 | Rosan _____ 29—282 XR |
| 2,949,800 | 8/1960 | Neuschotz _____ 81—53 |
| 3,081,808 | 4/1963 | Rosan et al. |
| 3,178,952 | 4/1965 | Oles. |

CHARLIE T. MOON, *Primary Examiner.*